(12) United States Patent
Kammonen

(10) Patent No.: US 6,457,331 B1
(45) Date of Patent: Oct. 1, 2002

(54) I.S. MACHINE

(75) Inventor: Jarmo Kammonen, Indal (SE)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/524,503

(22) Filed: Mar. 13, 2000

(51) Int. Cl.$^7$ ................................................ C03B 9/36
(52) U.S. Cl. .............................. 65/263; 65/29.1; 65/77; 65/81
(58) Field of Search .......................... 65/29.1, 77, 81, 65/161, 263

(56) References Cited

U.S. PATENT DOCUMENTS

| | | | | |
|---|---|---|---|---|
| 2,251,010 A | * | 7/1941 | Allen | 137/868 |
| 2,466,669 A | * | 4/1949 | Winder | 414/737 |
| 2,467,000 A | * | 4/1949 | Samuelson | 65/263 |
| 2,826,867 A | * | 3/1958 | Nava, Jr. et al. | 65/229 |
| 2,861,397 A | * | 11/1958 | Morel | 65/263 |
| 3,171,732 A | * | 3/1965 | Andersen | 65/229 |
| 4,492,595 A | * | 1/1985 | Nebelung et al. | 65/263 |
| 4,657,048 A | * | 4/1987 | Foster | 137/596.15 |
| 5,876,475 A | * | 3/1999 | Kozora | 137/625.48 |

* cited by examiner

*Primary Examiner*—Sean Vincent
(74) *Attorney, Agent, or Firm*—Spencer T. Smith

(57) ABSTRACT

A blank mold valving system for supplying vacuum/counter blow air to a blank mold of an I.S. The system includes an exhaust valve displaceable between open to exhaust and closed positions, a vacuum valve displaceable between open to vacuum and open to counter blow positions, and a counter blow valve displaceable between closed and open to counter blow air positions. A control operates the exhaust, vacuum and counter blow valves in a first deenergized mode wherein the exhaust valve is in the open to exhaust position, the vacuum valve is in the open to counter blow position, and the counter blow valve is in the closed position; in a second vacuum mode wherein the exhaust valve is in the closed position, the vacuum valve is in the open to vacuum position, and the counter blow valve is in the closed position, and in a third counter blow mode wherein the exhaust valve is in the closed position, the vacuum valve is in the open to counter blow position, and the counter blow valve is in the open to counter blow position.

1 Claim, 3 Drawing Sheets

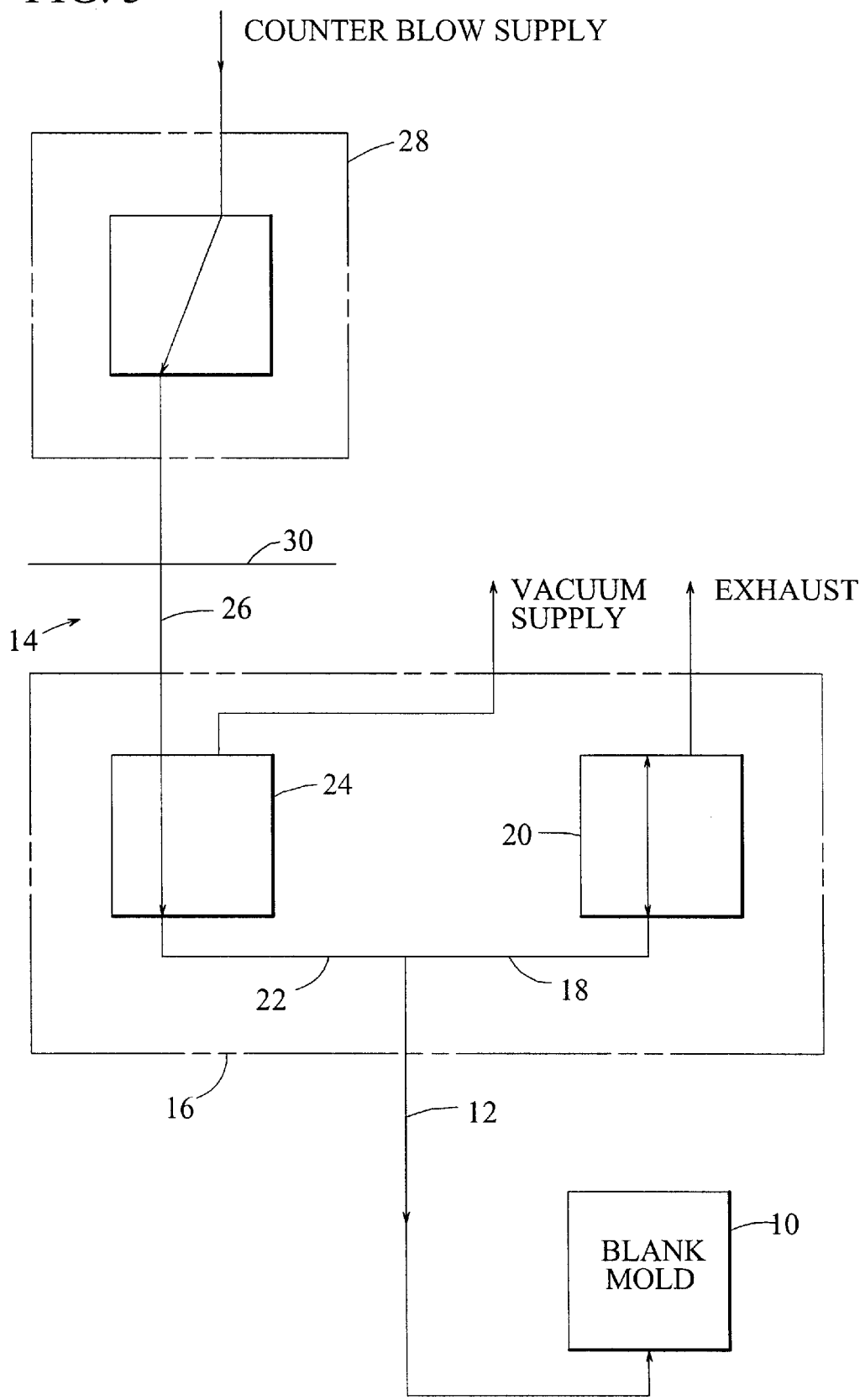

I.S. MACHINE

The present invention relates to machinery for manufacturing glass containers and specifically to an I.S. (individual section) machine which processes a gob of molten glass, in a two stage process, into a glass bottle.

BACKGROUND OF THE INVENTION

Each section of an I.S. machine has a blank station including a blank mold and a blow station including a blow mold. To form a bottle, a molten gob is loaded into a blank mold and formed into a parison. The parison is then transferred to the blow mold of the blow station where the parison is formed into the finished container. When both the parison and container are formed with pressurized air, this two stage process is referred to as a blow and blow process. In such a blow and blow process, the molten gob is dropped into a blank mold which is open at the top. A baffle is lowered onto the top of the mold to close the mold and air is introduced under pressure ("settle air") through the baffle to force the mold into the bottom most portion of the blank mold which will form the threaded top portion of a container. At the same time a vacuum will be applied at the bottom of the blank mold to draw the gob into the threaded portion of the mold. When the molten glass fills the threaded portion of the mold, counter blow air is applied from the bottom of the mold to blow the gob into the parison.

This gob forming process is controlled by solenoid operated air pilot valves operated by a timing control. In one case the counter blow and vacuum use separate valves connected together so that the vacuum flow is through the counter blow valve and the exhaust must flow through both valves to atmosphere. It is a disadvantage to have the valves for counter blow and vacuum arranged so that the vacuum, heated by the hot gob, can flow through the counter blow valve heating it up sufficiently to cause sluggish operation. In another case, a single valve is used for both counter blow and vacuum having a center position where all ports are blocked and a second valve, integrated with the main valve, is activated for exhaust when the main valve is in the center position. It is a disadvantage to have the exhaust flow through a number of valves thereby restricting airflow.

OBJECT OF THE INVENTION

Other objects and advantages of the present invention will become apparent from the following portion of this specification ad from the accompanying drawings which illustrate in accordance with the mandate of the patent statutes a presently preferred embodiment incorporating the principles of the invention.

BRIEF DESCRIPTION OF THE DRAWINGS

Referring to the drawings:

FIG. 3 is a view similar to that of FIG. 1 with the system in the counter blow energized mode shows.

BRIEF DESCRIPTION OF THE PREFERRED EMBODIMENT

Figure 1:
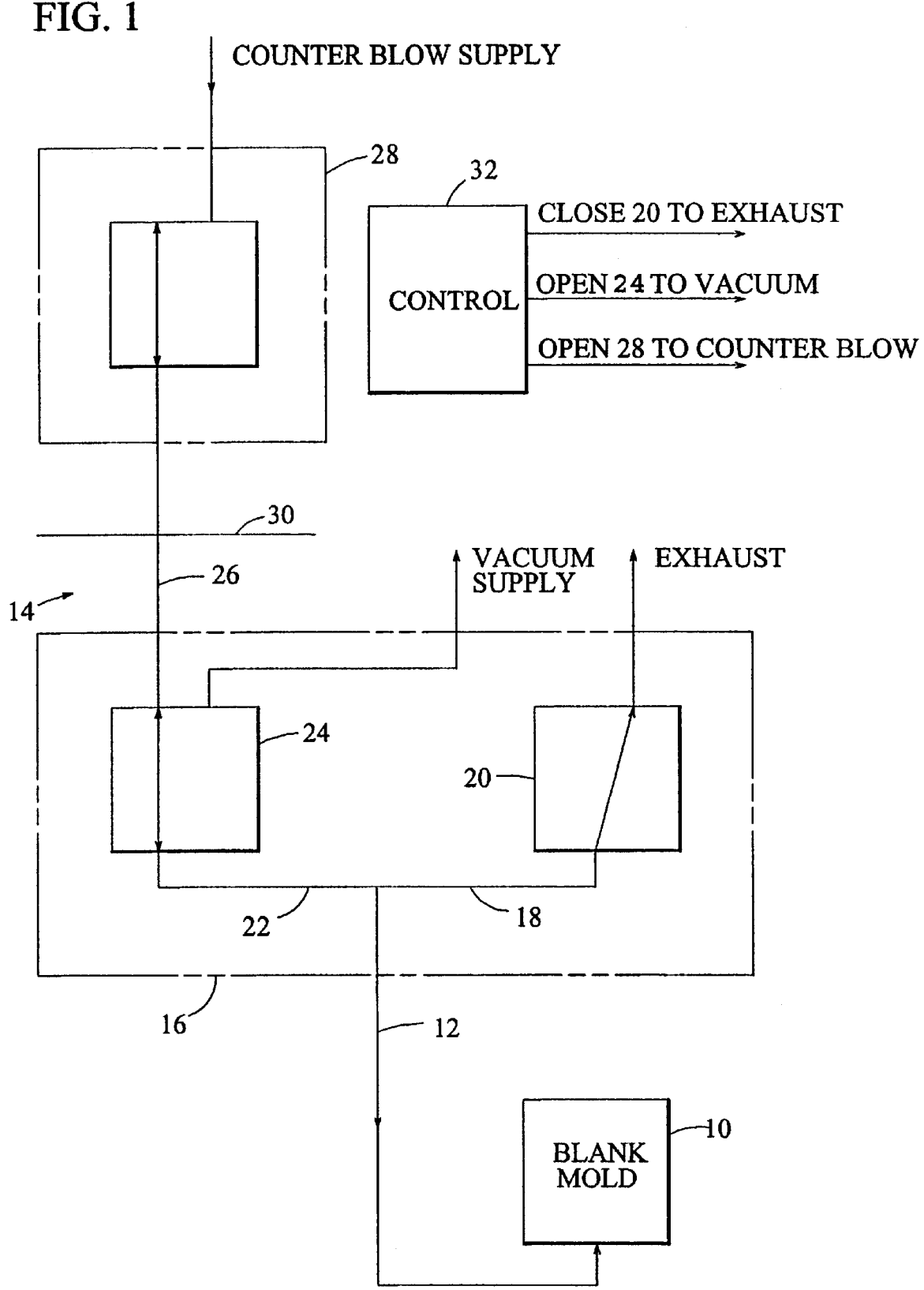
FIG. 1 shows a schematic drawing of a valve system for a blank mold of an I.S. machine which can alternately supply counter blow air or apply a vacuum to a blank mold, with the system in a deenergized exhaust mode.

Every blank station of a section of an I.S. machine includes a blank mold 10 which has an air connection 12 to a valve system 14. This valve system includes a valve body 16 which has a first air passage 18 connecting the air connection 12 to a first normally open exhaust valve 20 and a second air passage 22 connecting the air connection 12 to a second valve 24 normally closed to vacuum. A third air passage 26 exits the valve body and connects the closed to vacuum line of the second valve to a third valve 28 which is normally closed for counter blow. A gasket 30 is located intermediate the third valve and the valve body 16 to insulate the counter blow valve from the heat of the vacuum valve. A control 32 issues the required signals define three operating modes.

Figure 2:
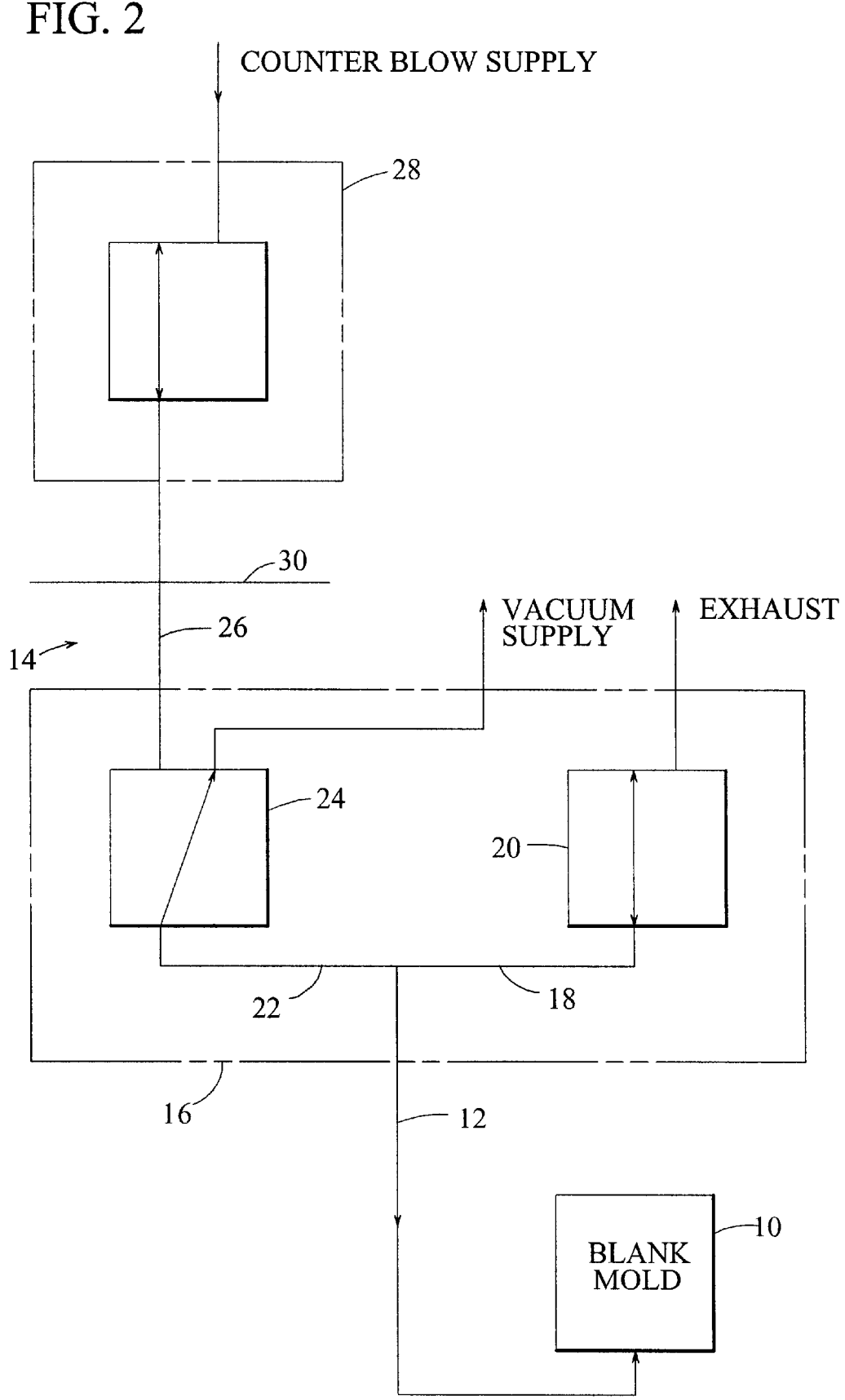
FIG. 2 is a view similar to that of FIG. 1 with the system in the vacuum valve energized mode.

FIG. 1 illustrates the valve system with all three valves set for the deenergized mode with the first valve 20 open to exhaust, the second valve 24 closed to vacuum and the third valve 28 closed to counter blow air. The valve cycle begins (FIG. 2) shifting the first valve to the exhaust closed position and shifting the vacuum valve to the vacuum open position. In this mode, the vacuum pulls air from the area below the gob drawing the gob downwardly into the finish. When this process is completed, the valve system is shifted to the counter blow mode illustrated in FIG. 3, where the exhaust remains closed, the vacuum valve is shifted to the open to counter blow position, and the counter blow valve is shifted to the open (connect to counter blow) position. When the parison is formed, the valve system is again switched to the deenergized mode.

What is claimed is:

1. A blank mold valving system for an I.S. machine comprising a blank mold, a counter blow/vacuum air line communicating with said blank mold, an exhaust valve communicating with said counter blow/vacuum air line, said exhaust valve displaceable between open to exhaust and closed positions a vacuum valve communicating with said counter blow/vacuum air line, said vacuum valve displaceable between open to vacuum and open to counter blow positions, a counter blow valve communicating with the open to counter blow position of said vacuum valve, said counter blow valve displaceable between closed and open to counter blow air positions, and a control for operating the exhaust, vacuum and counter blow valves in a first deenergized mode wherein
said exhaust valve is in the open to exhaust position,
said vacuum valve is in the open to counter blow position, and
said counter blow valve is in the closed position, in a second vacuum mode wherein
said exhaust valve is in the closed position,
said vacuum valve is in the open to vacuum position, and
said counter blow valve is in the closed position, and in a third counter blow mode wherein
said exhaust valve is in the closed position,
said vacuum valve is in the open to counter blow position, and
said counter blow valve is in the open to counter blow position.

* * * * *